US008714497B2

(12) United States Patent
Bricker

(10) Patent No.: US 8,714,497 B2
(45) Date of Patent: May 6, 2014

(54) TOOL STAND SUITABLE FOR TOOLS WITH ELONGATED HANDLES AND A COMBINATION TOOL AND TOOL STAND

(76) Inventor: Steven J. Bricker, DeWitt, MI (US)

( * ) Notice: Subject to any disclaimer, the term of this patent is extended or adjusted under 35 U.S.C. 154(b) by 171 days.

(21) Appl. No.: 13/461,314

(22) Filed: May 1, 2012

(65) Prior Publication Data

US 2013/0291695 A1 Nov. 7, 2013

(51) Int. Cl.
*A47G 23/02* (2006.01)
*F16M 11/06* (2006.01)
*F16M 11/04* (2006.01)

(52) U.S. Cl.
CPC .............. *F16M 11/06* (2013.01); *F16M 11/04* (2013.01)
USPC ........ 248/150; 248/125.7; 248/133; 248/136; 248/165; 248/166; 81/489; 172/371; 56/400.14

(58) Field of Classification Search
CPC ..... F16M 11/06; F16M 11/04; F16M 11/041; F16M 2200/00; F16M 2200/08; A01B 1/02; A01D 7/00; B25G 1/04; B25G 3/38; E01H 5/02; A63B 55/10; A63B 69/3632; A63B 69/3685; A47B 81/007; A47G 7/041; A47F 7/0028; B25H 3/04; B25H 3/003; B65D 2519/00164
USPC ........ 248/150, 97, 125.7, 127, 128, 133, 136, 248/153, 163.1, 165, 166, 176.1, 188.8, 248/309.1; 81/489; 172/371, 349; 37/266; 211/70.6, 195; 56/400.14, 400.13
See application file for complete search history.

(56) References Cited

U.S. PATENT DOCUMENTS

| 5,413,329 | A | * | 5/1995 | Hirsch .......................... 473/238 |
| 5,878,563 | A | * | 3/1999 | Dutcher ..................... 56/400.04 |
| D456,705 | S | * | 5/2002 | Vijn ............................... D9/668 |
| 6,637,180 | B2 | * | 10/2003 | Gullotti ....................... 56/400.01 |
| 7,686,277 | B2 | * | 3/2010 | Westgarde ..................... 248/688 |
| 2008/0083681 | A1 | * | 4/2008 | Cella et al. ................... 211/70.6 |
| 2009/0042662 | A1 | * | 2/2009 | Staszak ......................... 473/282 |
| 2011/0023443 | A1 | * | 2/2011 | Hatfield ..................... 56/400.11 |
| 2012/0137548 | A1 | * | 6/2012 | Kimball .......................... 37/266 |

* cited by examiner

*Primary Examiner* — Todd M Epps
(74) *Attorney, Agent, or Firm* — The Watson I.P. Group, PLC; Jovan N. Jovanovic; Vladan M. Vasiljevic

(57) ABSTRACT

A tool stand mountable to a tool having a relatively long handle. The handle has a tool head mounted to the second end of the handle. The tool stand has a pivot member, an axle, a rotational stop arm and a leg assembly. The pivot member is coupled to a handle between the first and second end thereof. The axle is rotatably coupled to the pivot member, with the axle rotation in an orientation that is oblique or substantially perpendicular to a handle. The rotational stop arm is fixed to the axle. The leg assembly extends toward a second end of a handle, with the rotational stop arm and the leg assembly being angled at an angle that is less than 180°. The leg assembly, the rotational stop arm and the axle are rotatable about the pivot member between a stowed orientation and an operational orientation.

18 Claims, 8 Drawing Sheets

TOOL STAND SUITABLE FOR TOOLS WITH ELONGATED HANDLES AND A COMBINATION TOOL AND TOOL STAND

BACKGROUND OF THE DISCLOSURE

1. Field of the Disclosure

The disclosure relates in general to tool stands, and more particularly, to a tool stand to allow a user to place a tool with an elongated handle in a position where the handle is readily accessible to the user. Although primarily directed for use with relatively long handle tools, such as gardening tools, it is not exclusively limited for use therewith.

2. Background Art

The use of long handled tools, or tools with an elongated handle, and the like is well known in the art. One such area where relatively long handled tools are utilized is in the field of gardening and outdoor work. Such tools include, but are not limited to rakes, hoes, shovels and the like. In the course of using such tools the user frequently desires to temporarily set the tool aside, either because of fatigue or because the user needs to do some other task with their hands. An individual's general inclination is to lean the tool against a nearby stable, vertical surface such as a tree, building, fence, etc. However, there is often not such a surface within several paces of where the user is working. As a result, the user either has to walk some distance to such a surface or place the tool on the ground. Thus, the user of such afore-mentioned tools has to either waste time walking back and forth to lean the tool against something or bend over repeatedly to place the tool onto and to retrieve the tool from the ground.

Certain solutions have been provided to couple a stand device or aid onto the tool to allow the tool to remain upright when not in use so that the handle can be readily accessible. Among other prior art, the following prior art references have been uncovered, namely, U.S. Pat. Nos. 5,878,563, 5,413,329, 6,637,180, 7,686,277, and D456,705S.

Problematically, these devices fail to provide the necessary features for a versatile tool stand. For example, some of such designs are difficult or costly to produce and assemble. Other stands have safety concerns. Still other stands have concerns relative to usability and versatility to operate on a number of different terrains.

SUMMARY OF THE DISCLOSURE

The disclosure, in one aspect, is directed to a combination tool member and tool stand assembly. The tool member comprises an elongated handle and a tool head. The handle includes a first end and a second end. A tool head includes a proximal end and a distal end, a working side and a back side opposite the working side. The proximal end of the tool head is coupled to the second end of the handle. The tool stand assembly comprises a pivot member, an axle, a rotational stop arm and a leg assembly. The pivot member is coupled to the handle between the first and second end thereof, and spaced apart from the second end. The axle is rotatably coupled to the pivot member, the axle rotates in an orientation that is one of oblique and substantially perpendicular to the handle. The rotational stop arm is fixed to the axle and extending toward the first end of the handle. The leg assembly is fixed to the axle and extending toward the second end of the handle. The rotational stop arm and the leg assembly are angled relative to each other at an angle that is less than 180°. The leg assembly, the rotational stop arm and the axle are rotatable about the pivot member between a stowed orientation and an operational orientation. In the stowed orientation, the leg assembly substantially abuts at least one of the tool head and the handle. In the operational orientation, the rotational stop arm substantially abuts the handle.

In a preferred embodiment, the leg assembly comprises an upper leg portion having a first end extending from the axle and a second end spaced opposite the first end. A first leg extends obliquely from the second end of the upper leg portion and a second leg extending obliquely from the second end of the upper leg portion, each of the first and the second legs having a second end. The second end of the first leg and the second end of the second leg are spaced apart from each other and end proximate to the distal end of the tool head.

In a preferred embodiment, in the stowed orientation, the leg assembly overlies the back side of the tool head.

In another preferred embodiment, the second end of the first leg and the second end of the second leg substantially correspond with the distal end of the tool head.

Preferably, the second end of the first leg and the second end of the second end are spaced apart from each other less than or equal to the maximum width of the associated tool head to avoid interference with tool head function.

In a preferred embodiment, the assembly further comprises a locking member coupled to the leg assembly. The locking member is configured to releasably lock the tool stand in the stowed orientation.

In another preferred embodiment, the locking member is positioned between the pivot member and the proximal end of the tool head assembly when the tool stand is in the stowed orientation.

In yet another preferred embodiment, the actuator arm includes an outer surface configuration which substantially matches the outer surface configuration of the handle member when the actuator arm is in the operational orientation.

In another preferred embodiment, the tool stand further includes a locking member coupled to the leg assembly. The locking member is configured to releasably lock the tool stand in the stowed orientation. Additionally, the locking member comprises a clip member on a first side thereof, and includes a plurality of openings on the other side thereof. The plurality of openings are in communication with a detent that is substantially perpendicular to the plurality of openings. The axle, rotational stop arm, upper portion and the first leg comprise a single rod member that is bent into the desired configuration. At least a portion of the single rod extends along at least a portion of the detent, and extends through a first one of the plurality of openings. The second leg comprises a second single rod member that is bent into the desired configuration. The second leg extends along at least a portion of the detent and extends through a second one of the plurality of openings.

In another aspect of the disclosure, the disclosure is directed to a tool stand assembly that is configured for use with a tool having an elongated handle.

In another aspect of the disclosure, the disclosure is directed to a method for operating a tool stand coupled to a tool comprising the steps of: providing a tool having a tool stand assembly coupled thereto, the tool stand having a pivot member fixed to an elongated handle of the tool, a rotational stop arm extending away from the pivot member toward a first end of the tool, and being rotatably coupled thereto, a leg assembly extending away from the pivot member toward a second end of the tool, the second end being coupled to a tool head, and the leg assembly being rotatably coupled to the pivot member and fixed to the rotational stop arm at an angle; placing the tool stand assembly in a stowed orientation, wherein the leg assembly is rotated about the pivot member until abuttingly positioned to the tool head; rotating the rotational stop arm into an abutting position relative to the handle; directing the leg assembly away from the tool head; stopping the rotation upon abutment of the rotational stop arm with the handle; placing the tool on a surface wherein the surface contacts the distal end of the leg assembly and a distal end of the tool head.

In a preferred embodiment, the step of rotating comprises rotating through less than 90°.

BRIEF DESCRIPTION OF THE DRAWINGS

The disclosure will now be described with reference to the drawings wherein.

DETAILED DESCRIPTION OF THE DISCLOSURE

Figure 1:
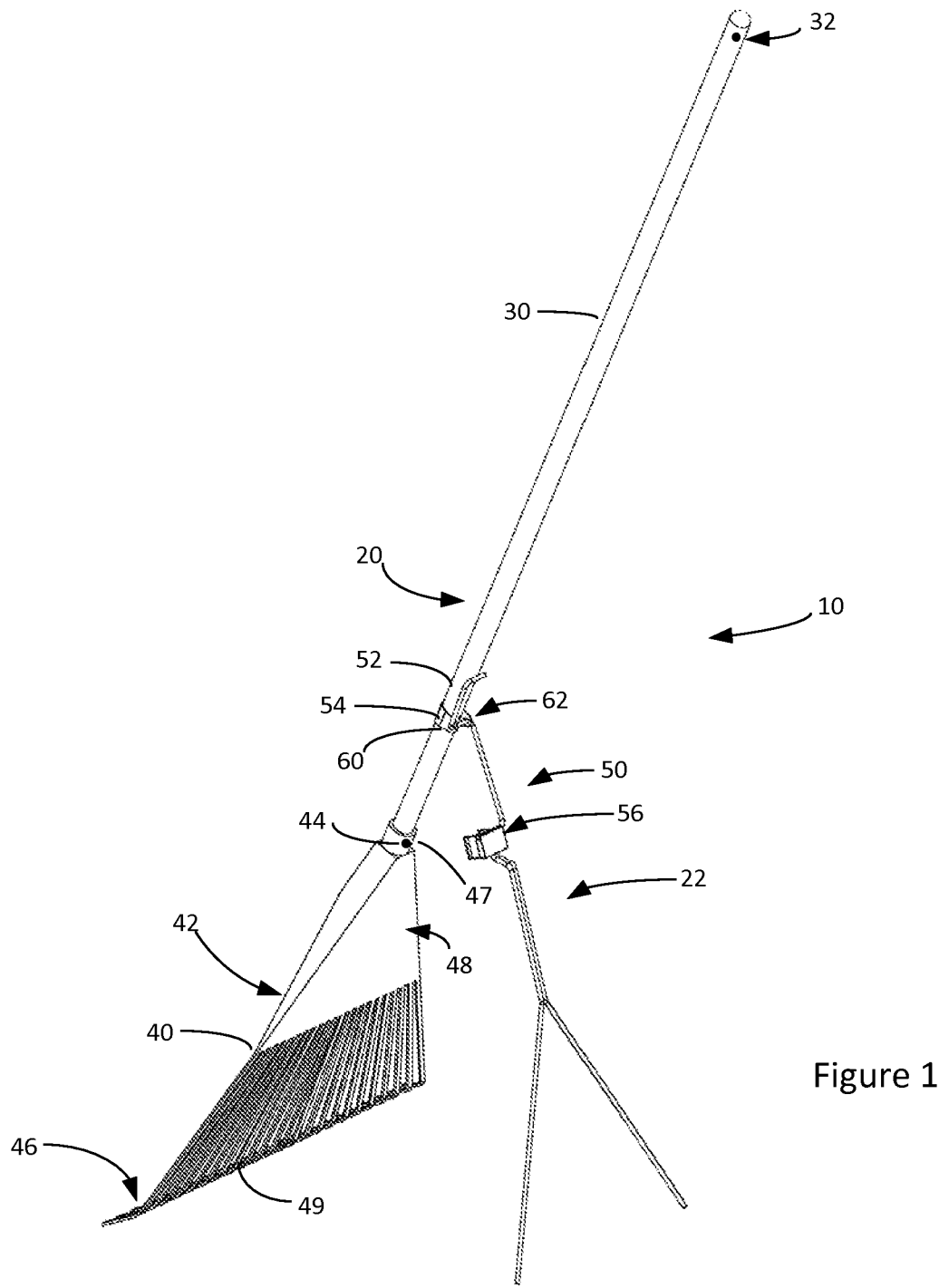
FIG. 1 of the drawings is a perspective view of a combination tool member and tool stand assembly of the present disclosure, showing, in particular, the operational orientation.

While this disclosure is susceptible of embodiment in many different forms, there is shown in the drawings and described herein in detail one specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the disclosure, and some of the components may have been distorted from actual scale for purposes of pictorial clarity.

Referring now to the drawings and in particular to FIG. 1, the combination tool stand and tool member having elongated handle is shown generally at 10 and includes tool member 20 and tool stand assembly 22. As disclosed above, the tool stand is shown as being used with a rake with the understanding that the tool stand is useable with any one of a number of different tools having elongated handles. Wherein such tools are repeatedly picked up and put down during a work cycle, the tool stand of the present disclosure is particularly useful.

With continued reference to FIG. 1, the tool member 20 comprises handle 30 and tool head assembly 40. As disclosed, the tool member shown in this disclosure comprises a rake which conventionally is utilized for gathering leaves, twigs and other particles. The handle 30 has a first end 32 and a second end 34 and is generally an elongated member of a substantially constant diameter. In many embodiments, the handle member comprises a straight member of approximately 55 inches to 80 inches. However, it is also contemplated that the handle member may include a number of bends, or curvatures, depending on the particular embodiment. The handle 30 may be constructed of any number of different materials, including, but not limited to metal (such as steel or aluminum), wood or wood-based products, plastic, or other synthetic material.

An opening for attachment to a hook or the like may be provided at the first end 32. In addition, a separate handling member may be coupled to the first end which provides for a particular grip by a user. The tool head assembly 40 is generally coupled near or at the second end 34. The tool head assembly 40 includes the tool head 42 and, optionally, a tool head fastener 44. The tool head 42 may be of any commercially available tools, including, but not limited to shovel, rake, hoe, among others. And, the rake is shown as exemplary only, and not to be limiting; the disclosure is not limited to any specific type of tool for tool head 42. The tool head 42 includes a proximal end 47 and a distal end 49. The tool head is coupled to the handle at the proximal end 47 and the distal end 49 includes the working end of the tool head.

In the embodiment shown, the tool head 42 further includes a working side 46 and a back side 48. The working side 46 comprises the side of the rake that points inward and makes the primary contact with the leaves or brush. The back side 48 comprises the side opposite the working side of the rake. While both sides are typically used, the back side of the rake generally does not make direct contact with the leaves or brush and typically the working motion is in a direction opposite of the back side of the tool head.

The tool head fastener 44 may be a common wood screw, a machine screw and nut, a threaded mating surface, or adhesive to permanently attach the handle 30 to the tool head 42. In other embodiments, the tool head may be molded with the handle, or may be press fit, or interference fit with the handle. In still other embodiments, a one way coupling, or a releasable coupling may be utilized.

The tool stand assembly 22 is shown in FIG. 1 as comprising rotational stop arm 52, leg assembly 50, pivot member 54 and locking member 56. As will be explained below, the rotational stop arm 52 and the leg assembly 50 are angularly disposed relative to each other and pivot about pivot member 54. The pivoting directs the leg assembly between a stowed orientation (FIG. 2) and a operational orientation (FIG. 1). In the stowed orientation, the leg assembly is positioned in an abutting relationship with the tool head 42 whereas these structures are angularly disposed relative to each other in the operational orientation.

Figure 5:
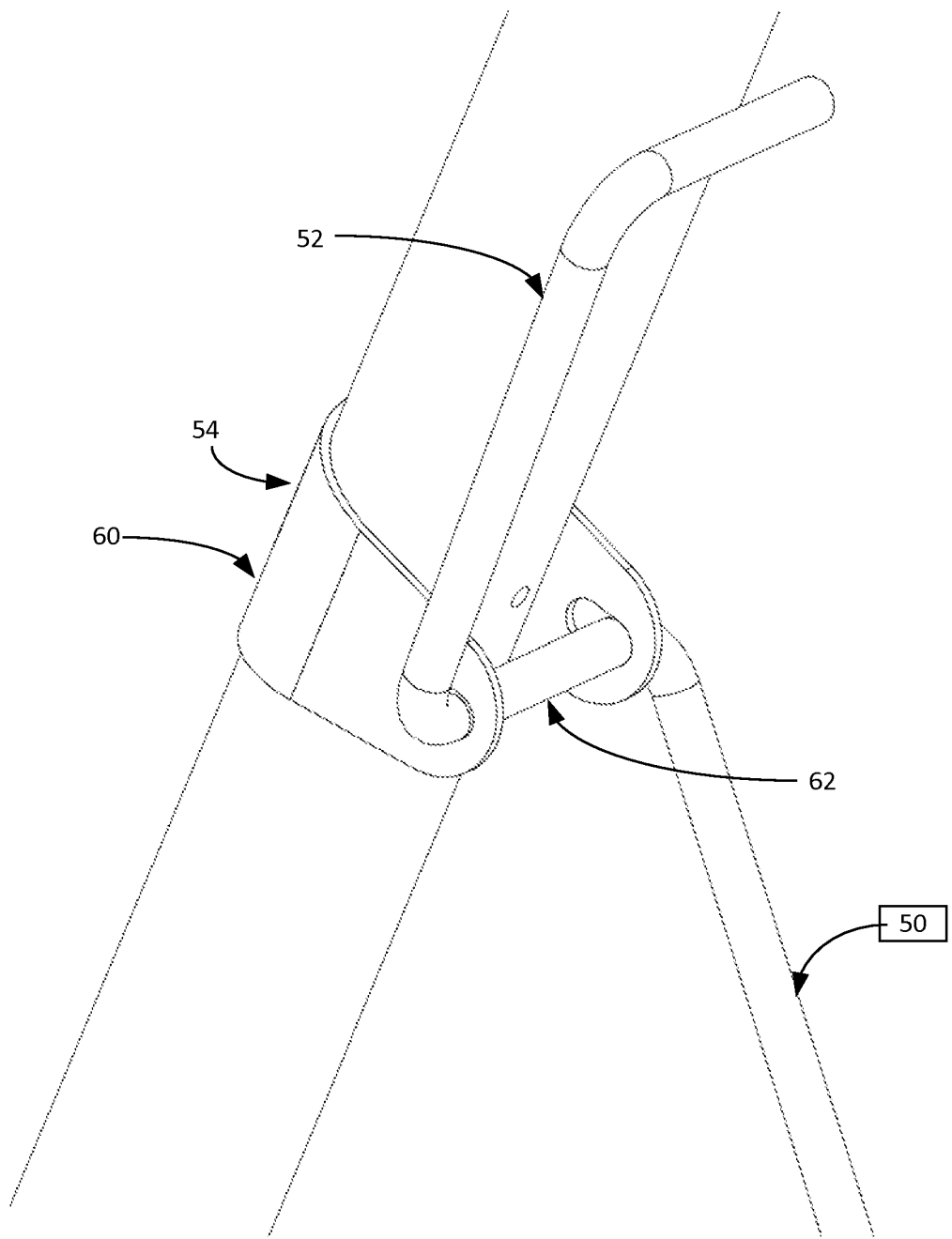
FIG. 5 of the drawings is a partial perspective view of the combination tool member and tool stand assembly of the present disclosure, showing, in particular, the pivot member, having an axle support and an axle, as well as the rotational stop arm and the leg assembly extending from the axle at an angle relative to each other and in the opposite direction.

The pivot member 54 is disposed between the first end 32 and the second end 34 of the handle 30, closer to the second end 34 while being spaced apart therefrom. The pivot member may comprise an axle which allows rotation in a direction that is substantially perpendicular to the handle. With reference to FIG. 5, the pivot member 54 includes an axle support member 60 which is fixed to the handle 30 and an axle 62 which is configured to rotate relative to the support member and the handle through a desired arc or rotation.

Figure 2:
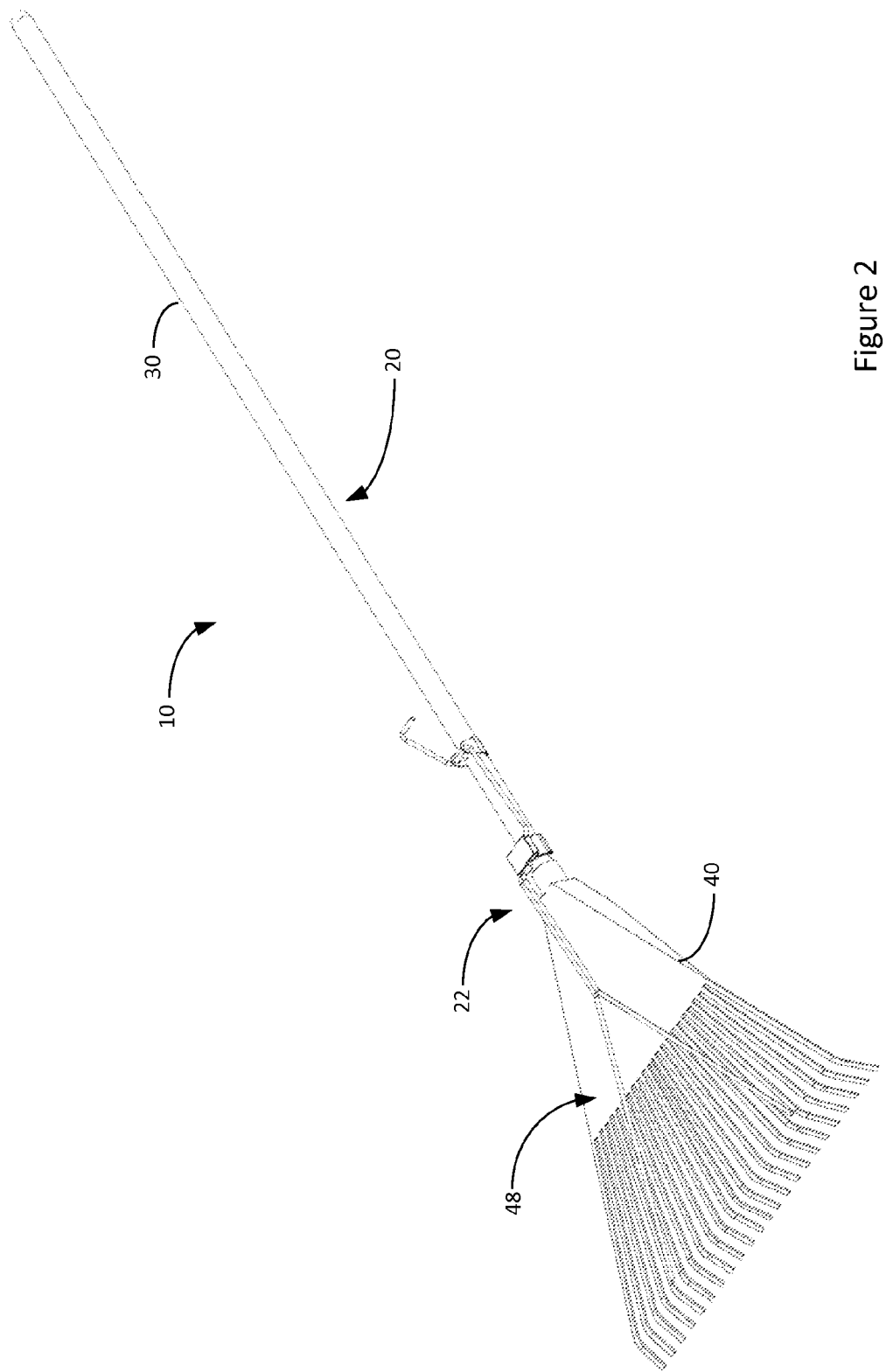
FIG. 2 of the drawings is a perspective view of a combination tool member and tool stand assembly of the present disclosure, showing, in particular, the stowed orientation.

With continued reference to FIGS. 1, 2 and 5, collectively, the rotational stop arm projects from the axle 62 toward the first end 32 of the handle 30. In the stowed orientation, the rotational stop arm extends away from the axle 62 at an angle relative to the portion of the handle therealong at an oblique angle. In the operation orientation the rotational stop arm is rotated so that the angle between the rotational stop arm and the handle becomes smaller, and in some instances, the rotational stop arm and the handle will abut each other. The rotational stop arm may have an outside surface which corresponds to the handle when in the operational configuration (i.e., the outside surface can be curved so that in the operational orientation, the rotational stop arm shape matingly overlies the handle). In another embodiment, with reference to FIG. 10, the rotational stop arm projects from the axle 62 toward the second end 34 of the handle 30, however, on the opposite side of the handle from the leg assembly. In such an embodiment, the operation is substantially identical, with the rotational stop arm hitting the handle on the side opposite the leg assembly and functions to stop the continued rotation, and, in turn, to define the deployed orientation.

With continued reference to FIGS. 1 and 5, collectively, the leg assembly 50 extends from the axle toward and beyond the second end of the handle 30. The leg assembly and the rotational stop arm are disposed at an angle relative to each other and are not collinear. They may be angularly displaced at an angle that is less than 180°, and preferably greater than 90°, more preferably between 110° and 150°. In the embodiment shown, the leg assembly extends toward and near the distal end 49 of the tool head 42.

Figure 3:
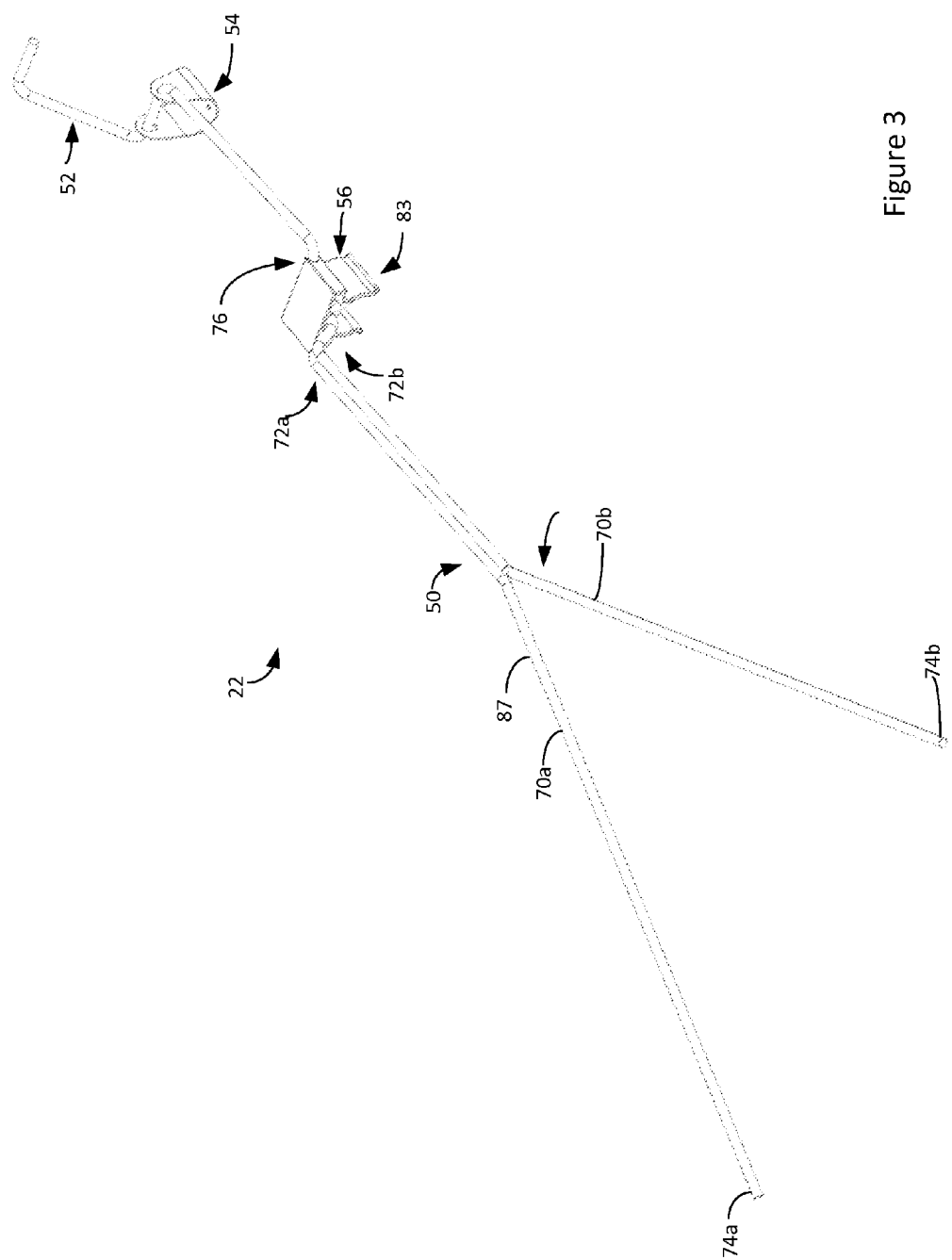
FIG. 3 of the drawings is a perspective view of the tool stand assembly.
Figure 4:
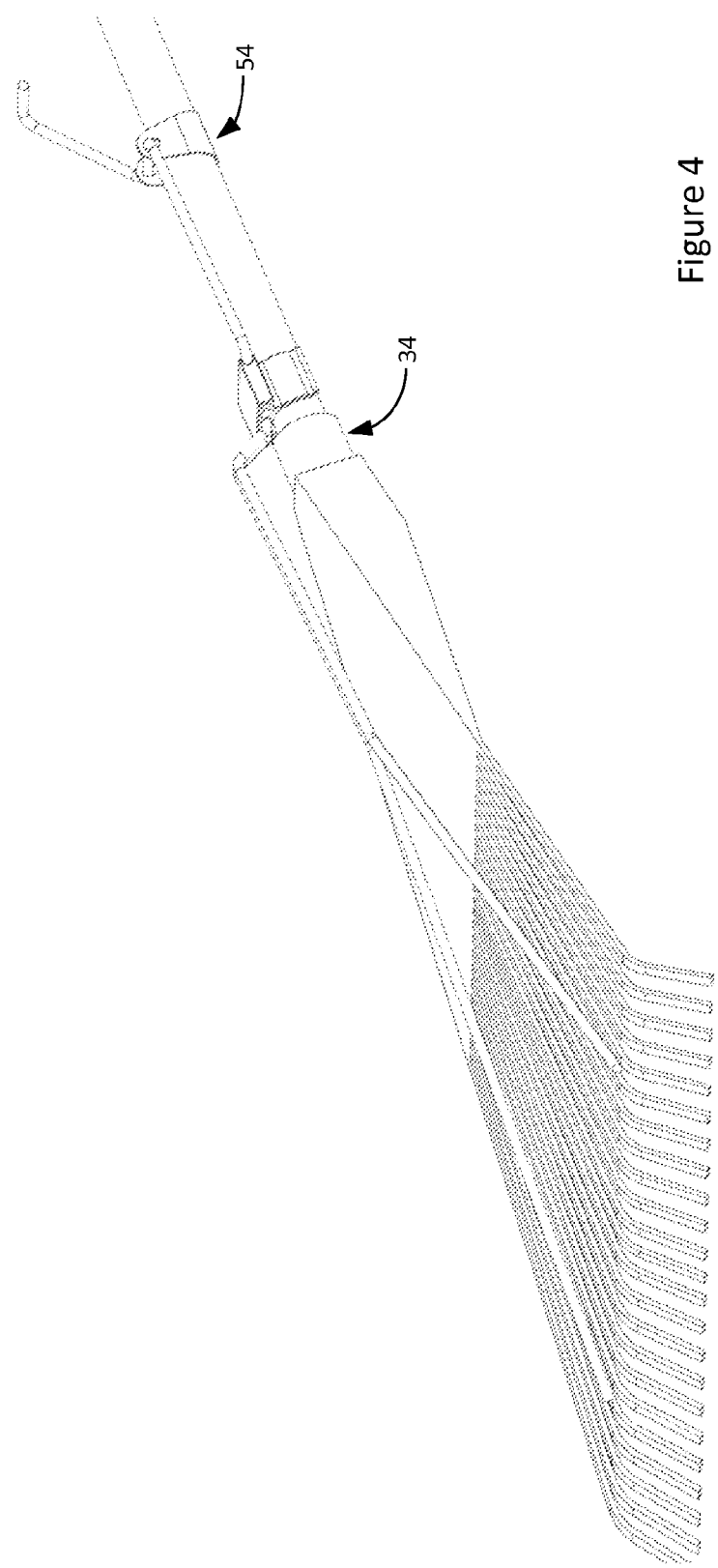
FIG. 4 of the drawings is a partial perspective view of the combination tool member and tool stand assembly of the present disclosure, showing, in particular, the stowed orientation.
Figure 6:
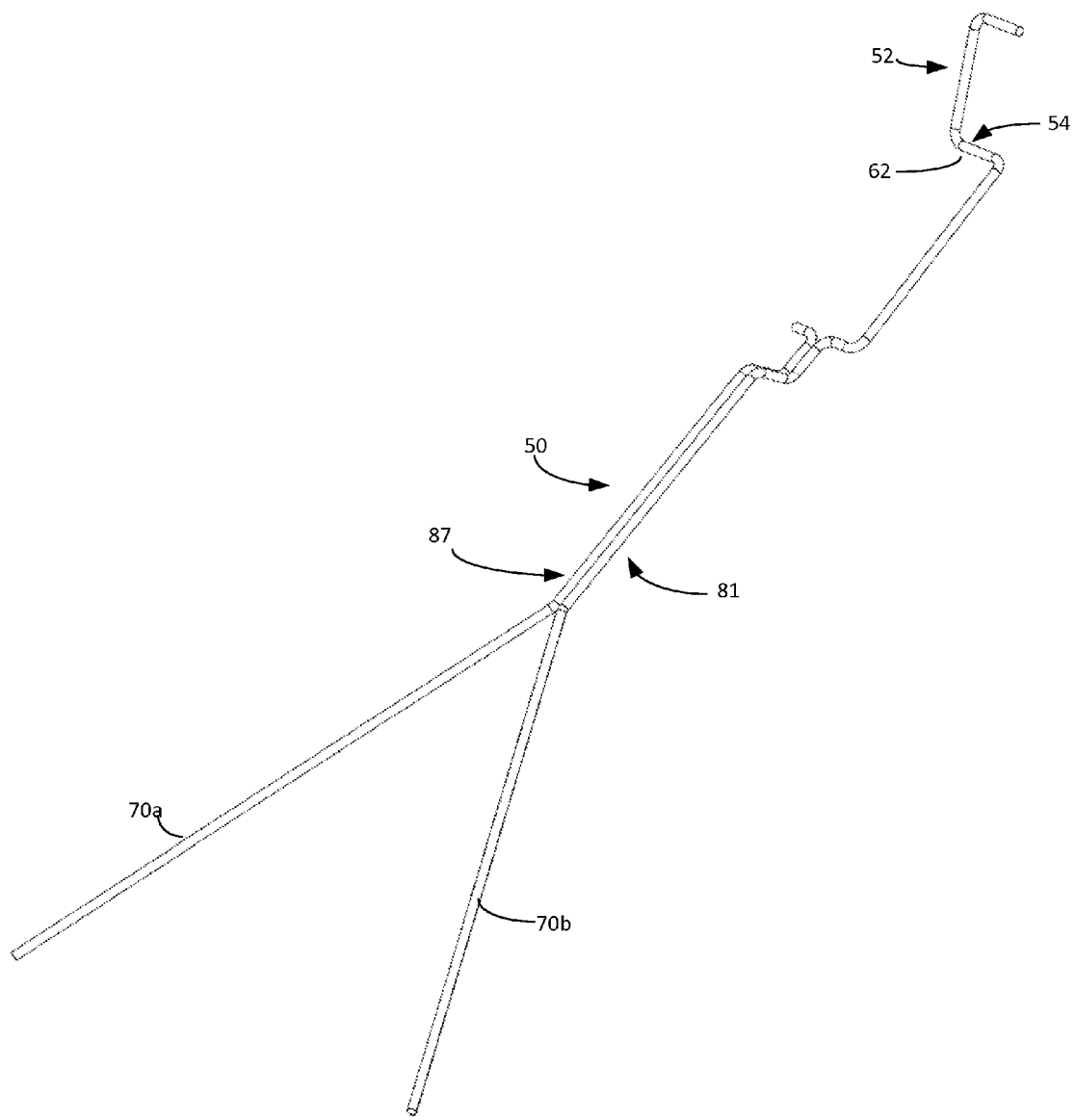
FIG. 6 of the drawings is a perspective view of a portion of the tool stand assembly, showing, in particular, the formation thereof from a pair of rods.
Figure 7:
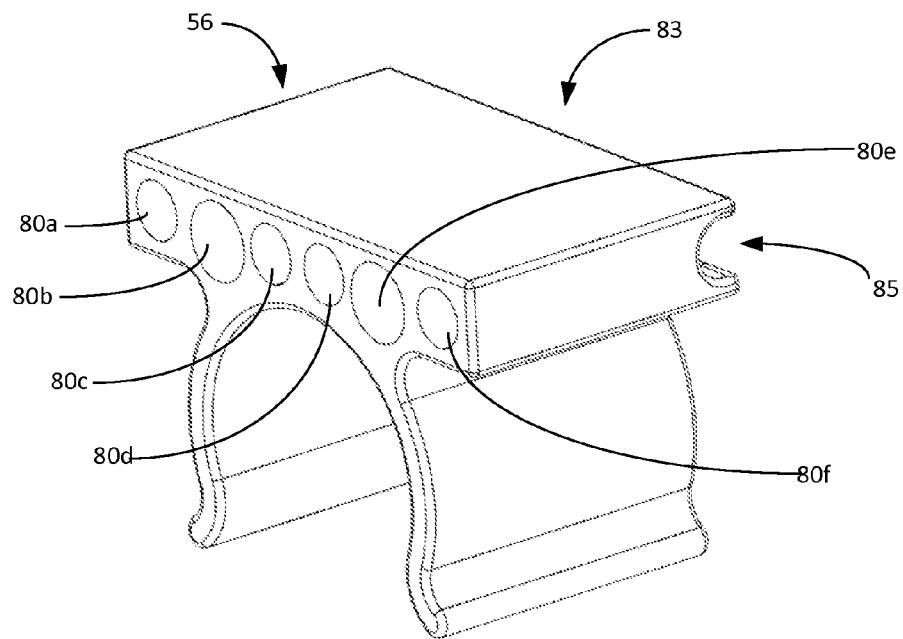
FIG. 7 of the drawings is a perspective view of the locking member of the present disclosure.
Figure 8:
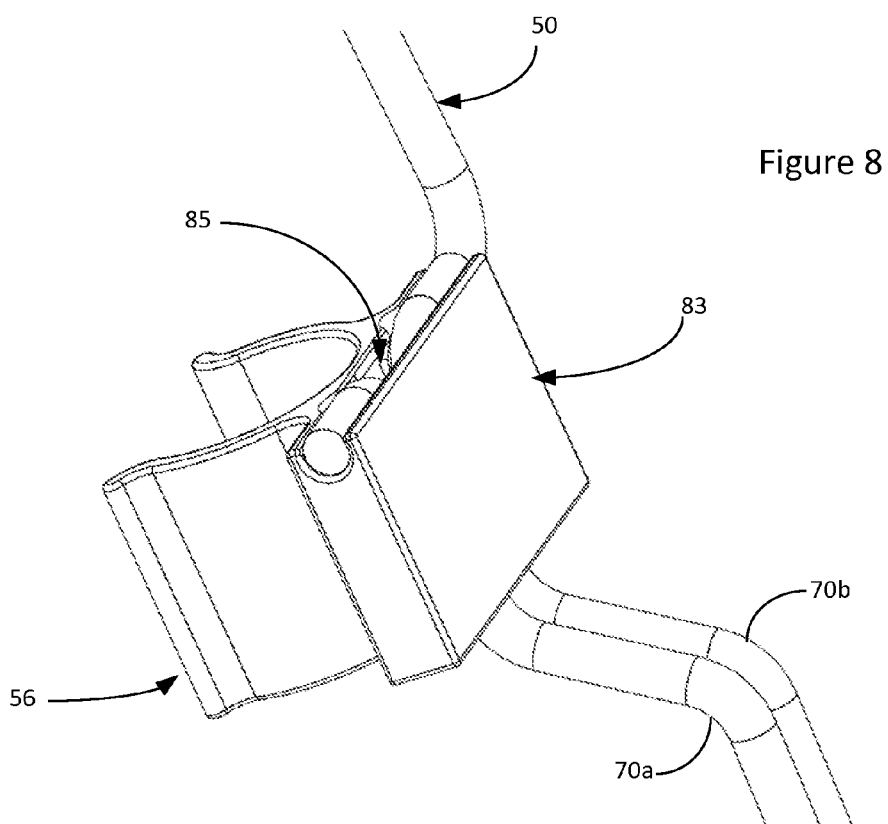
FIG. 8 of the drawings is a partial perspective view of the locking member in an operating configuration.
Figure 9:
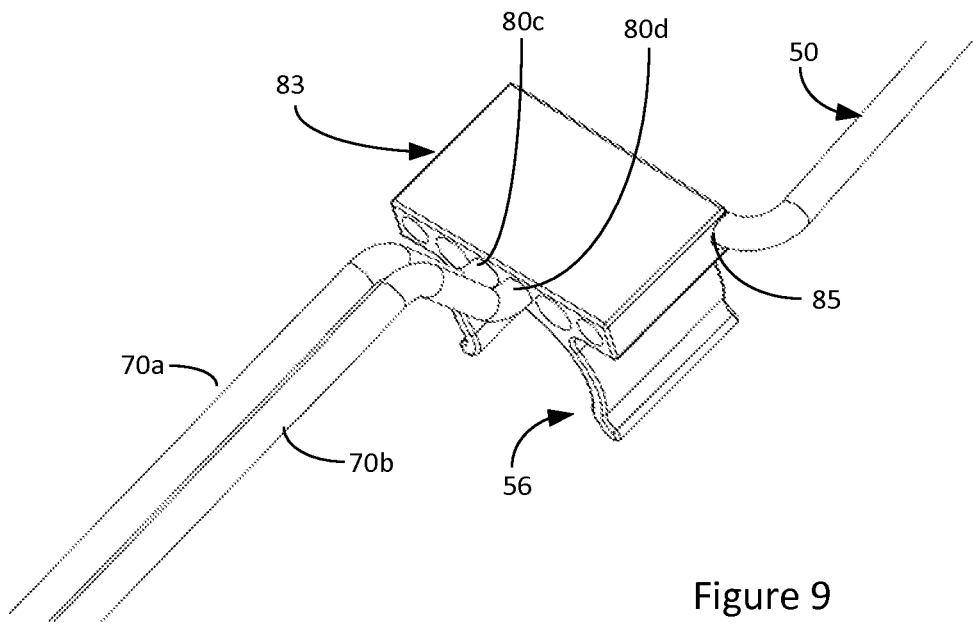
FIG. 9 of the drawings is a partial perspective view of the locking member in an operating configuration.

With reference to FIGS. 3 and 6, the leg assembly includes first leg 70a and second leg 70b. Each leg assembly includes a first end 72a, 72b and a second end 74a, b, respectively. The first ends 72a, 72b emanate directly from the axle 62 in certain embodiments, separately. In other embodiments, a co joined upper leg assembly 76 may extend from the axle 62, and the legs 70a, 70b are joined to an end thereof which is spaced apart from the axle 62. Whereas the legs 70a, 70b are in close proximity at a first end thereof, the legs are angled outwardly so that there is a substantial spacing between the second end 74a and the second end 74b. For example, at the first end, the first and second leg may be joined together, or minimally spaced apart. At a second end, the first and second leg may be separated by between 7 inches and 20 inches, or more. As will be explained, this distance and separation allows for improved stability, especially on ground that is uneven or when the tool head may contact the ground at only one point.

Locking member 56 is coupled on the leg assembly 50 in a spaced apart fashion from the pivot member 54. The locking member 56 is shown as comprising a clip member which releasably engages the handle member between the pivot member 54 and the second end 34 thereof. In other embodiments, a magnet, a fastening structure, a hook and loop fastener, among others is contemplated for use. It will additionally be understood that the locking member can be coupled to the leg assembly or to the handle and releasably coupled to the other of the two assemblies.

With particular reference to FIGS. 3 and 6, the rotational stop arm 52, the axle 62, the upper portion 76 and the second leg 70b are all formed from a single rod member 81 that is bent into the desired form. The first leg 70a is formed from a second rod member 87.

With reference to FIGS. 3 and 7-9, the locking member 56, comprises a molded member 83 that on the one side has a clip member configured to releasably engage the handle member, and opposite the clip member, includes a plurality of openings, namely openings 80a through 80f. The single rod member 81 extends through one of these openings, and, in particular, opening 80d. A second rod member 87 extends from rod opening 80c and forms the first leg 70a. A rod detent 85 extends laterally across the upper end of the molded member 83 substantially perpendicular to the openings 80a through 80f, and a portion of the single rod member 81 extends thereinto. Similarly, the upper end of the second rod member 87 likewise extends perpendicularly and lies within the rod detent 85. Such a configuration precludes rotational movement of the two rod members 87 and 81 relative to the axes of openings 80c and 80d respectively.

In operation, the tool stand assembly is attached to the handle of the tool member. In certain embodiments, the handle and the tool stand assembly may be assembled as a unit and sold as a unit. In other embodiments, the tool stand assembly may be sold as a separate unit (such as the unit shown in FIG. 3) and retrofit to any number of tools. In either manner, the principles of the present disclosure can be followed.

To install the tool stand assembly, the axle support 60 is coupled to the handle member at an appropriate distance from the second end 34 of the handle 30 and the tool head 42. Once positioned, it can be attached to the handle in any one of a number of different manners. For example, a fastener may pass through an opening in the axle support and into the handle. In other embodiments, the two may be adhered together, or heat welded to each other. It will be understood that the tool stand assembly can be directed down the handle from one end to the other to properly position the axle support 60. In one embodiment, this installation would be performed prior to the attachment of tool head 42 to handle 30. In other embodiments, it may be necessary to remove the tool head 42, or a structure at the first end of the handle to allow the handle to pass between the opening created by the axle support 60 and the axle 62.

Figure 10:
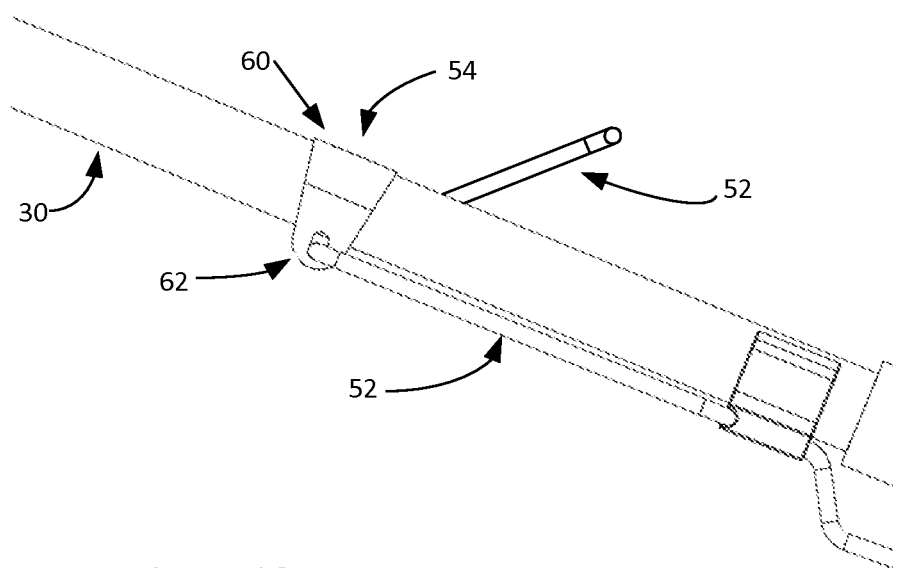
FIG. 10 of the drawings is a partial perspective view of the rotational stop arm extending toward the second end of the handle, and on the opposite side of the handle from the leg assembly.

Initially, the tool stand assembly is in the stowed orientation (i.e., the configuration of FIG. 2) wherein the leg assembly 50 is positioned proximate the handle and the tool head assembly, and the rotational stop arm extends angularly from the axle 62 away from the handle 30 (either on the same side of the handle as the leg assembly and extending toward the first end of the handle, or on the opposite side of the handle relative to the leg assembly as shown in FIG. 10). Additionally, the locking member 56 is releasably engaged with the handle which precludes inadvertent movement of the tool stand assembly relative to the handle. To direct the tool stand assembly into the operational orientation, and, in turn, to utilize the tool stand assembly, the user grasps the leg assembly proximal to its first ends, 72a and 72b with one hand while grasping handle 30 at any point between where the rotational stop arm 52 will contact the handle and handle first end 32 with the other hand. At this point, using the thumb of the hand grasping the leg assembly, pressure may be applied to either the backside of tool head 42 or an equivalent surface on the abutting handle 30 so as to cause locking member 56 to disengage from handle 30.

The leg assembly will now freely rotate away from the handle and the tool head so that the second end of the legs 70a, 70b are spaced apart from the distal end 49 of the tool head 42. As the leg assembly and the rotational stop arm are directly connected, the angular displacement of the rotational stop arm matches the angular displacement of the leg assembly. At some point in the rotation, the rotational stop arm reaches the end of its rotational travel, and is precluded from further rotative movement. This typically occurs through a rotation of less than 90°, and it will be understood that it depends on the angular displacement of the rotational stop arm and the handle when the tool stand is in the stowed orientation. The movement is completed generally when at least a portion of the rotational stop arm contacts and abuts the handle. In such a configuration, it will be understood that the rotational stop arm forms a stop and maintains the stand in the operational configuration.

When this end of travel has been reached, the tool stand assembly is in the operational orientation (i.e., the configuration of FIG. 1). The user can place the tool in a substantially vertical orientation so that the handle is easily reachable with the tool being maintained in the proper orientation by the second ends 74a, 74b of the first and second legs 70a, 70b. The second ends of the first and second legs are spaced apart a distance which enhances the stability of the substantially vertical orientation. In addition, the two ends are not coupled together so that each end can contact the ground or an outside surface substantially independently of the other leg, to, in turn, allow each leg to find a stable position without being overly limited by the other leg.

When the user is ready to stow the tool stand assembly (to again utilize the tool, for example), the user can push or otherwise rotate the leg assembly 50 to direct the leg assembly toward the tool head 42. When the locking member reaches the handle, the user can overcome the clip, and locking member will re-engage the handle. At the same time, the rotational stop arm returns to its original orientation, oblique to the handle. The tool stand assembly is now returned to the stowed orientation and the tool is ready for use.

The foregoing description merely explains and illustrates the disclosure and the disclosure is not limited thereto except insofar as the appended claims are so limited, as those skilled in the art who have the disclosure before they will be able to make modifications without departing from the scope of the disclosure.

What is claimed is:

1. A tool stand mountable to a tool having a relatively long handle, the handle having a first end and a second end, and a tool head mounted to the second end of the handle comprising:
   a pivot member coupled to the handle between the first and second ends thereof;
   an axle rotatably coupled to the pivot member, the axle rotates in an orientation that is one of oblique and substantially perpendicular to the handle;
   a rotational stop arm fixed to the axle and extending one of toward a first end of the handle or extending toward the second end of the handle;
   a leg assembly fixed to the axle and extending toward a second end of the handle, with the rotational stop arm and the leg assembly being angled relative to each other at an angle that is less than 180°, wherein the leg assembly, the rotational stop arm and the axle are rotatable about the pivot member between a stowed orientation and an operational orientation, wherein in the stowed orientation, the leg assembly substantially abuts at least one of a tool head and the handle, and wherein in the operational orientation, the rotational stop arm substantially abuts the handle, with the rotational stop arm being positioned on a same side of the handle as the leg assembly, or on an opposite side of the handle of the leg assembly, wherein when positioned on the same side, the rotational stop arm extends toward the first end of the handle, and wherein when positioned on an opposite side of the handle, the rotational stop arm extends toward a second end of the handle.

2. The tool stand of claim 1 wherein the leg assembly comprises a upper leg portion having a first end extending from the axle and a second end spaced opposite the first end, a first leg extending obliquely from the second end of the upper leg portion and a second leg extending obliquely from the second end of the upper leg portion, each of the first and the second legs having a second end, wherein the second end of the first leg and the second end of the second leg are spaced apart from each other and end proximate a distal end of the tool head.

3. The tool stand of claim 2 further comprising a locking member coupled to the leg assembly, the locking member configured to releasably lock the tool stand in the stowed orientation.

4. The tool stand of claim 3 wherein:
   the locking member comprises a clip member on a first side thereof, and including a plurality of openings on a second side thereof, the plurality of openings in communication with a detent that is substantially perpendicular to the plurality of openings,
   the axle, rotational stop arm, upper portion and the first leg comprising a single rod member that is bent into a desired configuration, with at least a portion of the single rod extending along at least a portion of the detent, and extending through a first one of the plurality of openings,
   the second leg comprising a second single rod member that is bent into the desired configuration, the second leg extending along at least a portion of the detent and extending through a second one of the plurality of openings.

5. The tool stand of claim 3 wherein the axle, rotational stop arm and upper portion comprise a single rod member that is bent into a desired configuration.

6. The tool stand of claim 5 wherein the first and second legs are formed from a second single rod member, wherein the second single rod member is coupled to the upper portion of the single rod member.

7. The tool stand of claim 6 wherein the locking member comprises a third single rod member configured to releasably engage the handle.

8. A combination tool member and tool stand assembly comprising:
   a tool member having an elongated handle with a first end and a second end, a tool head having a proximal end and a distal end, and a working side and a back side opposite the working side, the proximal end of the tool head coupled to the second end of the handle;
   a tool stand assembly comprising:
      a pivot member coupled to the handle between the first and second ends thereof, and spaced apart from the second end;
      an axle rotatably coupled to the pivot member, the axle rotates in an orientation that is one of oblique and substantially perpendicular to the handle;
      a rotational stop arm fixed to the axle and extending one of toward the first end of the handle or extending toward the second end of the handle;
      a leg assembly fixed to the axle and extending toward the second end of the handle, with the rotational stop arm and the leg assembly being angled relative to each other at an angle that is less than 180°, wherein the leg assembly, the rotational stop arm and the axle are rotatable about the pivot member between a stowed orientation and an operational orientation, wherein in the stowed orientation, the leg assembly substantially abuts at least one of the tool head and the handle, and wherein in the operational orientation, the rotational stop arm substantially abuts the handle, with the rotational stop arm being positioned on a same side of the handle as the leg assembly, or on an opposite side of the handle of the leg assembly, wherein when positioned on the same side, the rotational stop arm extends toward the first end of the handle, and wherein when positioned on an opposite side of the handle, the rotational stop arm extends toward the second end of the handle.

9. The combination tool member and tool stand assembly of claim 8 wherein the leg assembly comprises a upper leg portion having a first end extending from the axle and a second end spaced opposite the first end, a first leg extending obliquely from the second end of the upper leg portion and a second leg extending obliquely from the second end of the upper leg portion, each of the first and the second legs having a second end, wherein the second end of the first leg and the second end of the second leg are spaced apart from each other and end proximate the distal end of the tool head.

10. The combination tool member and tool stand assembly of claim 9 wherein in the stowed orientation, the leg assembly overlies a back side of the tool head.

11. The combination tool member and tool stand assembly of claim 10 wherein the second end of the first leg and the second end of the second leg substantially correspond with the distal end of the tool head.

12. The combination tool member and tool stand assembly of claim 11 wherein the second end of the first leg and the second end of the second leg are spaced apart from each other less than or equal to a maximum width of the associated tool head.

13. The combination tool member and tool stand of claim 8 further comprising a locking member coupled to one of the handle and the leg assembly, and releasably coupled to other of the handle and the leg assembly, the locking member configured to releasably lock the tool stand in the stowed orientation.

14. The combination tool member and tool stand of claim 13 wherein the locking member is positioned between the pivot member and the proximal end of the tool head assembly.

15. The combination tool member and tool stand of claim 8 wherein the rotational stop arm includes an outer surface configuration which substantially matches the outer surface configuration of the handle when the rotational stop arm is in the operational orientation.

16. The combination tool member and tool stand of claim 9 wherein the tool stand further includes a locking member coupled to the leg assembly, the locking member configured to releasably lock the tool stand in the stowed orientation, wherein:
the locking member comprises a clip member on a first side thereof, and including a plurality of openings on a second side thereof, the plurality of openings in communication with a detent that is substantially perpendicular to the plurality of openings,
the axle, rotational stop arm, upper portion and the first leg comprising a single rod member that is bent into a desired configuration, with at least a portion of the single rod extending along at least a portion of the detent, and extending through a first one of the plurality of openings,
the second leg comprising a second single rod member that is bent into the desired configuration, the second leg extending along at least a portion of the detent and extending through a second one of the plurality of openings.

17. A method for operating a tool stand coupled to a tool comprising the steps of:
providing a tool having the tool stand assembly coupled thereto, the tool stand having a pivot member fixed to an elongated handle of the tool, a rotational stop arm extends away from the pivot member toward a first end of the tool, and is rotatably coupled thereto, a leg assembly extends away from the pivot member toward a second end of the tool, the second end being coupled to a tool head, and the leg assembly is pivotably coupled to the pivot member and fixed to the rotational stop arm at an angle;
placing the tool stand assembly in a stowed orientation, wherein the leg assembly is rotated about the pivot member until abuttingly positioned to the tool head;
rotating the rotational stop arm into an abutting position relative to the handle;
directing the leg assembly away from the tool head;
stopping a rotation upon abutment of the rotational stop arm with the handle;
placing the tool on a surface wherein a surface contacts the leg assembly and a distal end of the tool head.

18. The method of claim 17 wherein the step of rotating comprises rotating through less than 90°.

* * * * *